(12) United States Patent
Jacobson et al.

(10) Patent No.: US 7,895,755 B2
(45) Date of Patent: Mar. 1, 2011

(54) REPLACEABLE DEMOLITION SHEAR PIERCING TIP

(75) Inventors: Daniel P. Jacobson, Wrenshall, MN (US); Bruce Bacon, Duluth, MN (US); Ross D. Christenson, Esko, MN (US)

(73) Assignee: Genesis Attachments, LLC, Cedar Rapids, IA (US)

( * ) Notice: Subject to any disclaimer, the term of this patent is extended or adjusted under 35 U.S.C. 154(b) by 0 days.

(21) Appl. No.: 11/032,838

(22) Filed: Jan. 10, 2005

(65) Prior Publication Data

US 2005/0115076 A1    Jun. 2, 2005

Related U.S. Application Data

(63) Continuation of application No. 10/299,543, filed on Nov. 18, 2002, now Pat. No. 6,839,969.

(51) Int. Cl.
    *B02C 1/06* (2006.01)
(52) U.S. Cl. .......................................... 30/134; 30/228
(58) Field of Classification Search .................. 30/134, 30/194, 228, 223, 349; 241/101.73; 144/34.5
    See application file for complete search history.

(56) References Cited

U.S. PATENT DOCUMENTS

| | | | |
|---|---|---|---|
| 4,104,792 A | 8/1978 | LaBounty | |
| 4,188,721 A | 2/1980 | Ramun et al. | |
| 4,198,747 A | 4/1980 | LaBounty | |
| 4,403,431 A | 9/1983 | Ramun et al. | |
| 4,543,719 A | 10/1985 | Pardoe | |
| 4,558,515 A | 12/1985 | LaBounty | |
| 4,897,921 A | 2/1990 | Ramun | |
| 5,187,868 A * | 2/1993 | Hall | 30/134 |
| 5,533,682 A | 7/1996 | de Gier | |
| 5,873,168 A * | 2/1999 | Johnson et al. | 30/134 |
| 5,894,666 A | 4/1999 | Hrusch | |
| 5,992,023 A | 11/1999 | Sederberg et al. | |
| 6,119,970 A | 9/2000 | LaBounty et al. | |
| 6,655,054 B1 | 12/2003 | Ward | |
| 6,839,969 B2 | 1/2005 | Jacobson et al. | |
| 6,926,217 B1 | 8/2005 | LaBounty et al. | |
| 2002/0011535 A1 | 1/2002 | Cook | |

FOREIGN PATENT DOCUMENTS

| | | |
|---|---|---|
| DE | 29708705 U1 | 7/1997 |
| DE | 29715490-US | 12/1997 |
| EP | 0666131 A1 | 1/1995 |
| EP | 0768137 A1 | 4/1997 |

(Continued)

*Primary Examiner*—Phong H Nguyen
(74) *Attorney, Agent, or Firm*—Gerald E. Helget; Nelson R. Capes; Briggs and Morgan, P.A.

(57) ABSTRACT

A heavy-duty demolition shear with a replaceable shearing tip has a lower jaw and an upper jaw piviotally connected to the lower jaw. The upper jaw has primary and secondary shear blades. A replaceable shearing tip is mounted to the upper jaw. The replaceable shearing tip has two L-shaped sections which engage the upper jaw between them. The replaceable shearing tip engages the upper jaw on at least three seats. The replaceable shearing tip is connected to the upper jaw by socket-head cap-screws.

6 Claims, 6 Drawing Sheets

FOREIGN PATENT DOCUMENTS

| | | |
|---|---|---|
| FR | 2822482 A1 | 9/2002 |
| JP | 01010827 A | 1/1989 |
| JP | 09-195528 * | 7/1997 |
| JP | 09195528 | 7/1997 |
| WO | WO-01/68992 | 9/2001 |
| WO | WO-2004/013417 A1 | 2/2004 |

* cited by examiner

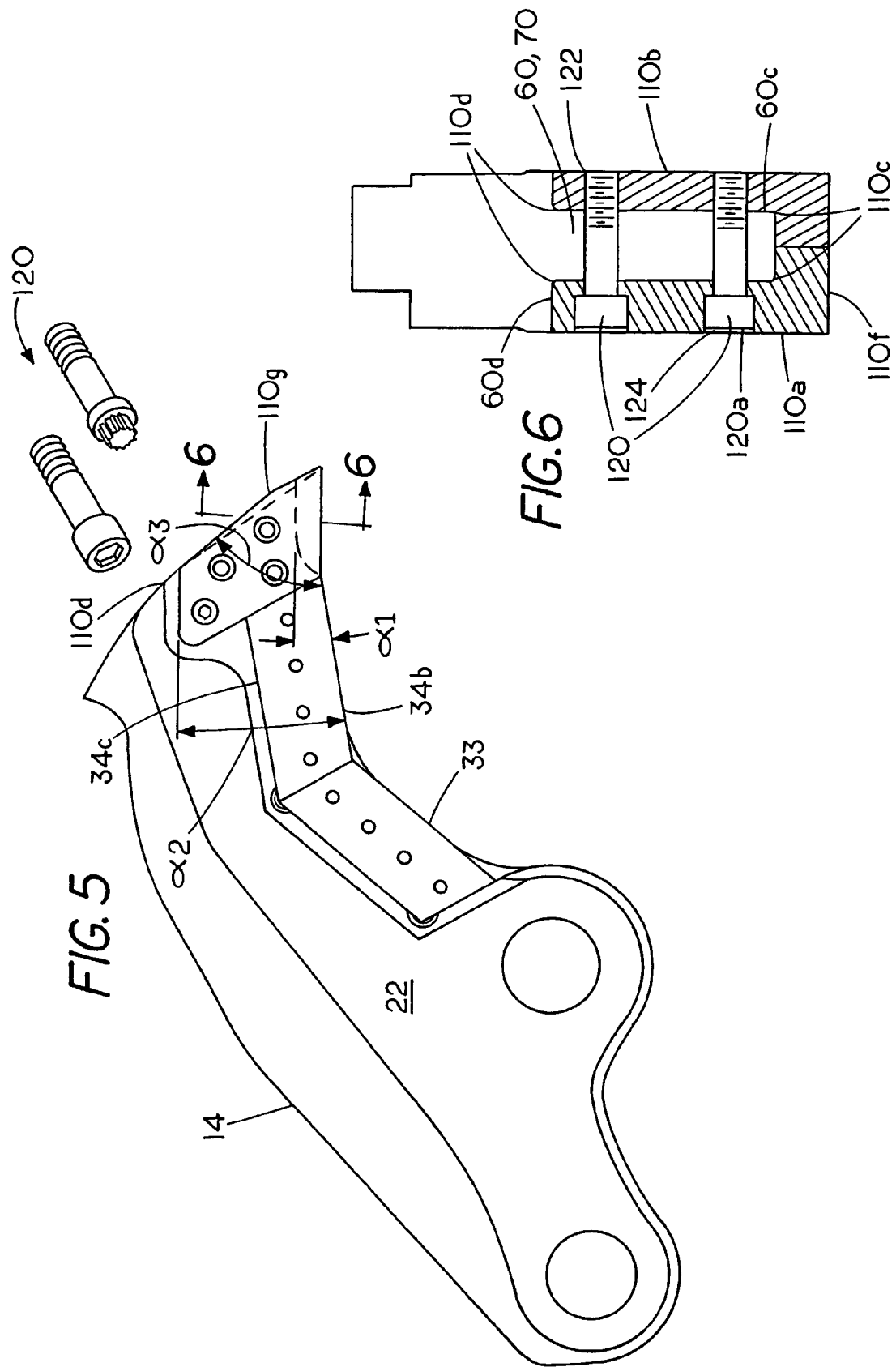

US 7,895,755 B2

REPLACEABLE DEMOLITION SHEAR PIERCING TIP

This is a continuation of application Ser. No. 10/299,543, filed Nov. 18, 2002 now U.S. Pat. No. 6,839,696.

BACKGROUND OF THE INVENTION

A fuller understanding of the operation of the demolition apparatus of the present invention may be achieved by studying U.S. Pat. No. 4,519,135, hereby incorporated by reference. This invention relates to a heavy duty demolition apparatus, especially adapted to be mounted on a rigid boom of a mobile vehicle and particularly adapted to be mounted on the dipper stick of an excavator.

The invention also has a replaceable shearing tip on the movable upper jaw.

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8 or 10 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. No. 4,198,747; U.S. Pat. No. 4,188,721; U.S. Pat. No. 4,897,921; U.S. Pat. No. 4,543,719; U.S. Pat. No. 4,558,515 and U.S. Pat. No. 4,104,792. Typically, these heavy duty shears mount on the dipper stick of an excavator so that the shears may be controlled fairly well in handling various types of scrap and cutting the scrap into smaller twisted and contorted pieces and lengths as the scrap is drawn into the throat of the shear.

Typically, these shears have a fixed lower jaw and a movable upper jaw that pivots on the lower jaw, with shear blades of hardened steel on both the upper jaw and the lower jaw. The workpiece is sheared by closing the upper jaw against the lower jaw under hydraulic pressure, with the shear blades cutting the workpiece. The movable upper jaw may also have a fixed, hardened shearing tip integral with the upper jaw. The tip is not suitable for removal and replacement due to the high lateral forces exerted on the tip as the movable jaw flexes laterally. Great tension is also exerted upon the tip, which may be wedged tight with scrap, upon opening the jaws. Direct shear bearing loads are also on the tip when shearing. All these factors will cause a removable tip to readily break off the upper jaw.

There is a need for a heavy duty demolition shear with a replaceable shearing tip

SUMMARY OF THE INVENTION

A heavy-duty demolition shear with a replaceable shearing tip has a lower jaw and an upper jaw piviotally connected to the lower jaw. The upper jaw has primary and secondary shear blades. A replaceable shearing tip is mounted to the upper jaw. The replaceable shearing tip has two L-shaped sections which engage the upper jaw between them. The replaceable shearing tip engages the upper jaw on at least three seats. The replaceable shearing tip is connected to the upper jaw by socket-head cap-screws.

A principal object and advantage is that the upper jaw has a replaceable shearing tip.

Another object and advantage is that the replaceable tip is held in place by socket-headed cap-screws which will hold the tip in place despite high direct and lateral/forces, as well as stress shearing forces and tensional forces exerted on the tip when opening the shear with jammed scrap pieces about the tip.

Another object and advantage is that the tip is supported on the upper jaw on at least three seating surfaces, which alleviates stress shearing forces and tensional forces.

Another object and advantage of the present invention is that the tip encapsulates the upper jaw and prevents the upper jaw from being damaged by forces exerted on the tip.

Other advantages will be understood from reading the Detailed Description of Preferred Embodiments.

BRIEF DESCRIPTION OF THE DRAWINGS

FIG. 5 is a partial right-side elevational view of the upper jaw of the apparatus with the tip mounted thereon, showing various angles.

FIG. 6 is a cross-section at approximately the lines 6 of FIG. 5.

FIG. 7b is a cross-sectional view taken at approximately the lines 7b in FIG. 7a.

DETAILED DESCRIPTION OF THE PREFERRED EMBODIMENTS

Figure 1:
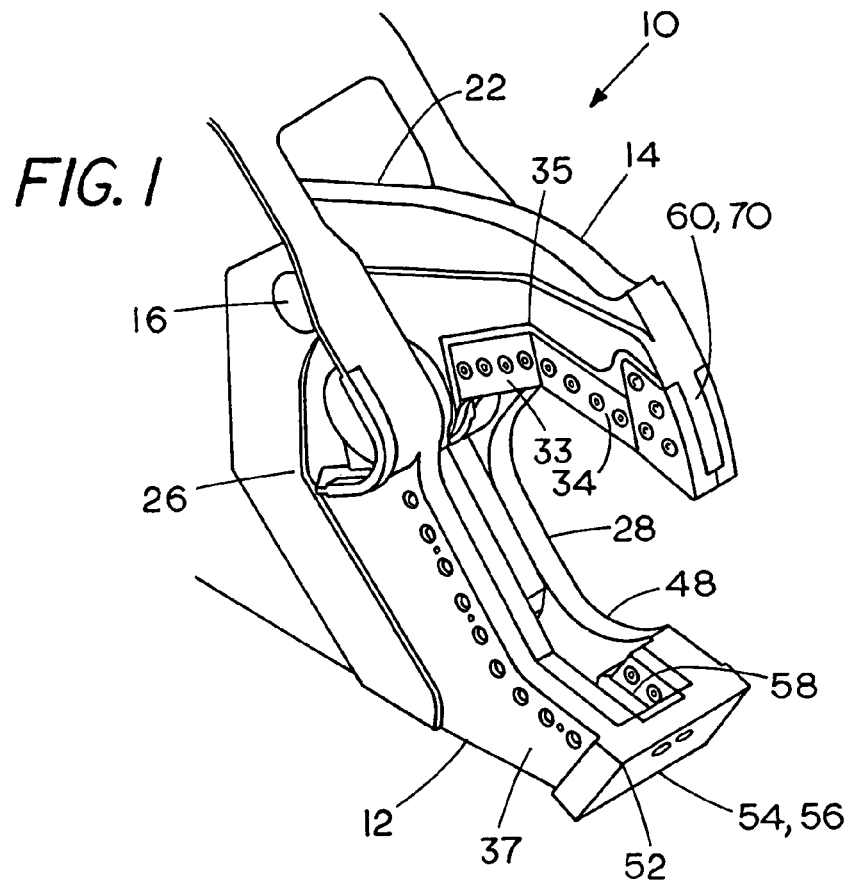
FIG. 1 is a right-side perspective view of the demolition apparatus with the replaceable shearing tip of the present invention, showing the tip assembled on the apparatus.
Figure 2:
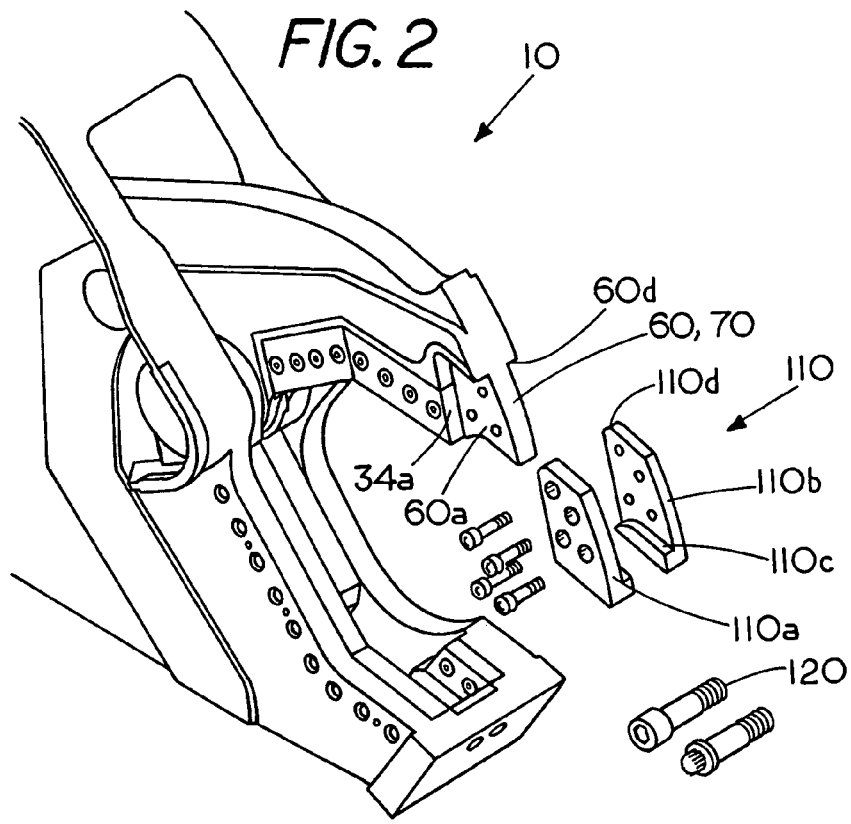
FIG. 2 is like FIG. 1, but with the tip exploded off the apparatus (disassembled).
Figure 3:
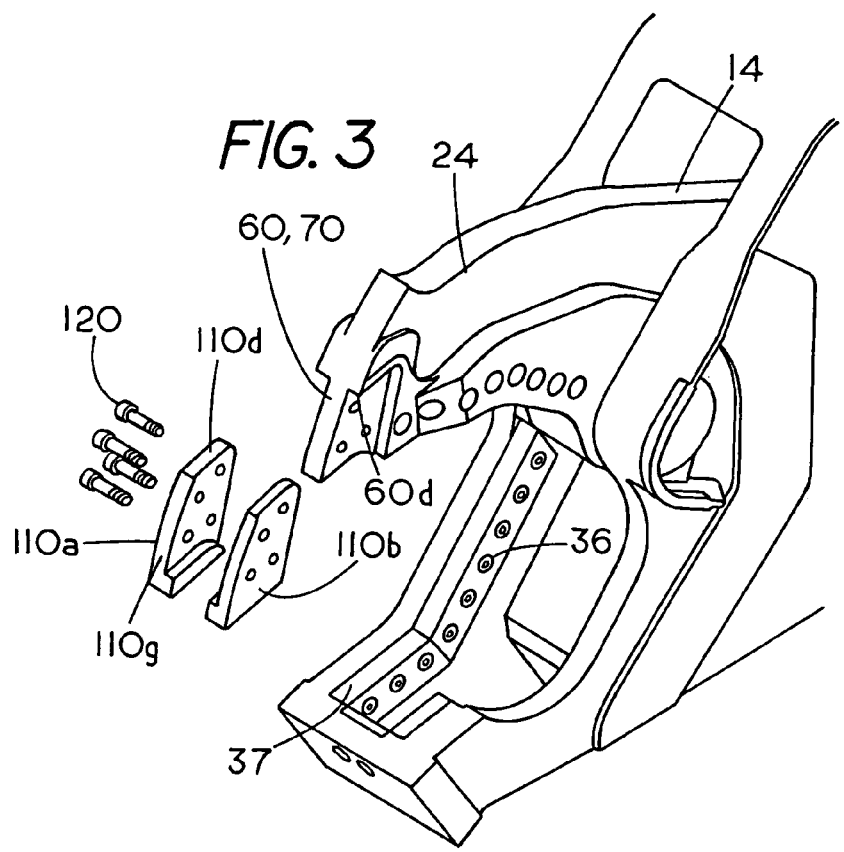
FIG. 3 is similar to FIG. 2, but is a left-side perspective view.
Figure 4:
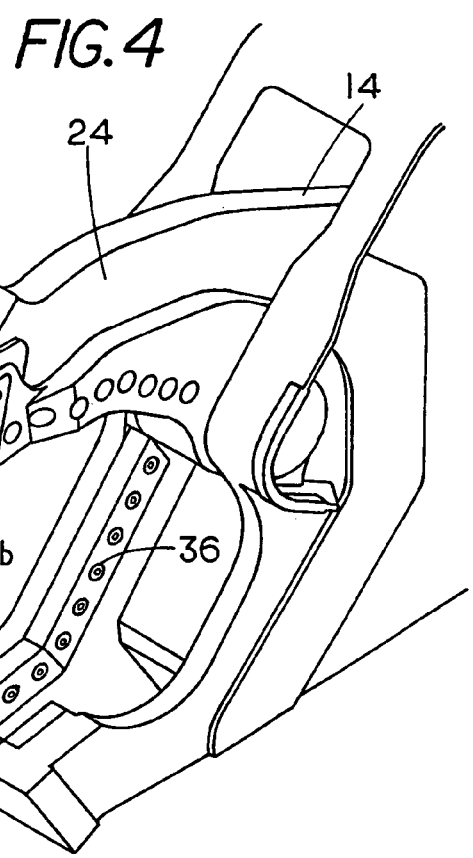
FIG. 4 is similar to FIG. 1, but is a left-side perspective view.

The heavy-duty demolition apparatus of the present invention is generally referred to in the Figures as reference numeral 10.

Referring to FIGS. 1 through 6, the heavy-duty demolition apparatus 10 comprises a lower jaw 12, an upper jaw 14, and pivot means 16 interconnecting the lower jaw 12 and upper jaw 14.

The upper jaw 14 has a first side 22, and a second side 24. The lower jaw 12 has a first mounting plate 26 adjacent the first side 22, and a second mounting plate 28 adjacent the second side 24. The first mounting plate 26 and second mounting plate 28 receive the pivot means 16 between them.

The upper jaw 14 has upper shear blades 33 and 34 meeting at apex 35 and the lower jaw 12 has lower shear blades 36 and 37 extending along each other for shearing a workpiece when the upper shear blades 33 and 34 are closed upon the lower shear blades 36 and 37. Preferably, the shear blades 33, 34, 36 and 37 are replaceable.

Preferably, the apparatus 10 further comprises a guide blade 48 on the lower jaw 12 lying along the lower shear blade 36 and in spaced relation therewith, the outer end 50 of the guide blade and outer end 52 of the shear blade being adjacent each other, and rigid means 54 securing the outer ends 50, 52 together. The rigid means 54 is preferably a tie plate 56.

An open slot 58 preferably exists between the lower shear blade 36 and the adjacent guide blade 48 to receive the upper shear blade 34 therein, the open slot 58 having a width wider than the thickness of the upper shear blade 34 to maintain open space between the upper shear blade 34 and the guide blade 48 when the upper shear blade 34 is in the open slot 58.

On the first shearing side 22, the upper jaw will receive the upper primary shear blade 31 and the upper secondary shear blade 33. The shear blades 31 and 33 meet at the upper shear blade apex 35 which is the last point wherein the upper jaw 14 shears a workpiece against lower elongate shear blade 36. On the lower jaw 12, the lower primary shear blade 36 and lower secondary shear blade 37 are received.

To accommodate secure attachment of the replaceable shearing tip 110, the upper, movable jaw 14 is modified to include a tip mounting portion 60, as seen in FIGS. 1-4.

The tip mounting portion 60 further comprises a first mounting surface 60a on the first side 22 of the upper jaw 14, and a second mounting surface 60b on the second side 24. A third mounting surface 60c is located on the bottom side of the upper jaw 14 between the first mounting surface 60a and the second mounting surface 60b. A fourth mounting surface 60d is located above each of the first 60a and second 60b mounting surfaces on the upper jaw 14. Between the first mounting surface 60a and the second mounting surface 60b is narrowed upper jaw tip portion 70.

The replaceable shearing tip 110 comprises a first half 110a and a second half 110b. The first half 110a mounts to the first mounting surface 60a, while the second half 110b mounts to the second mounting surface 60b. Each of the first half 110a and second half 110b has a ledge or flange 110c that engages the third mounting surface 60c. In overall configuration, it will be seen that each of the first half 110a and second half 110b is "L"-shaped in cross-section. In addition, each of the first half 110a and second half 110b has a top edge 110d that engages the fourth mounting surface 60d. The first half 110a and second half 110b each have a rear surface 110e that engages the upper secondary shear blade 34 at forward edge 34a. The first half 110a and second half 110b each have a bottom edge 110f.

Figure 8:
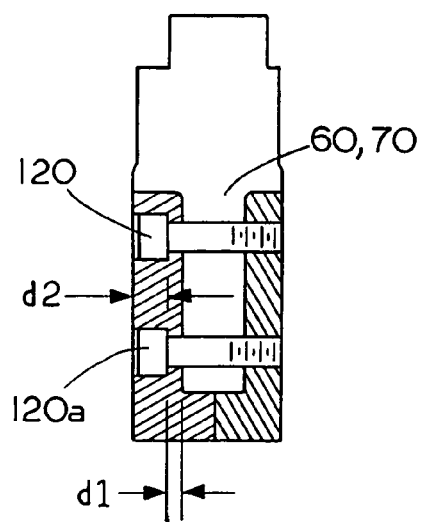
FIG. 8 is similar to FIG. 6, showing additional dimensions.

As best seen in FIG. 6, the replaceable shearing tip 110 is preferably mounted to the tip mounting portion 60 by socket head or spline-head cap-screws 120. Holes 122 are drilled through the first half 110a and the second half 110b to receive the cap-screws 120. The second half 110b is preferably tapped with internal threads that engage external threads on the cap-screw 120. The first half 110a is preferably counter-bored with counter-bores 124 to receive the head 120a of the cap-screw 120. As can be seen, most preferably the thickness of the first half 110a that has the counter-bore 124 is equal to or greater than the thickness of the second half 110b. Also, the thickness of the narrowed upper jaw tip portion 70 is equal to or greater than thickness of either the first half 110a or the second half 110b. Further, as seen best in FIG. 8, the thickness of d1 the material of the first half 110a beneath and supporting the cap-screw head 120a is less than the depth d2 of the cap-screw head counter-bore 124. These structural features provide structural strength to the components.

For stress relief, it is highly preferred that the top edge 110d is radiused where it meets the third mounting surface 60c, which is similarly radiused. Also, the bottom ledge or flange 110c is partially radiused where it meets the third mounting surface 60c. See FIG. 6.

Figure 7A:
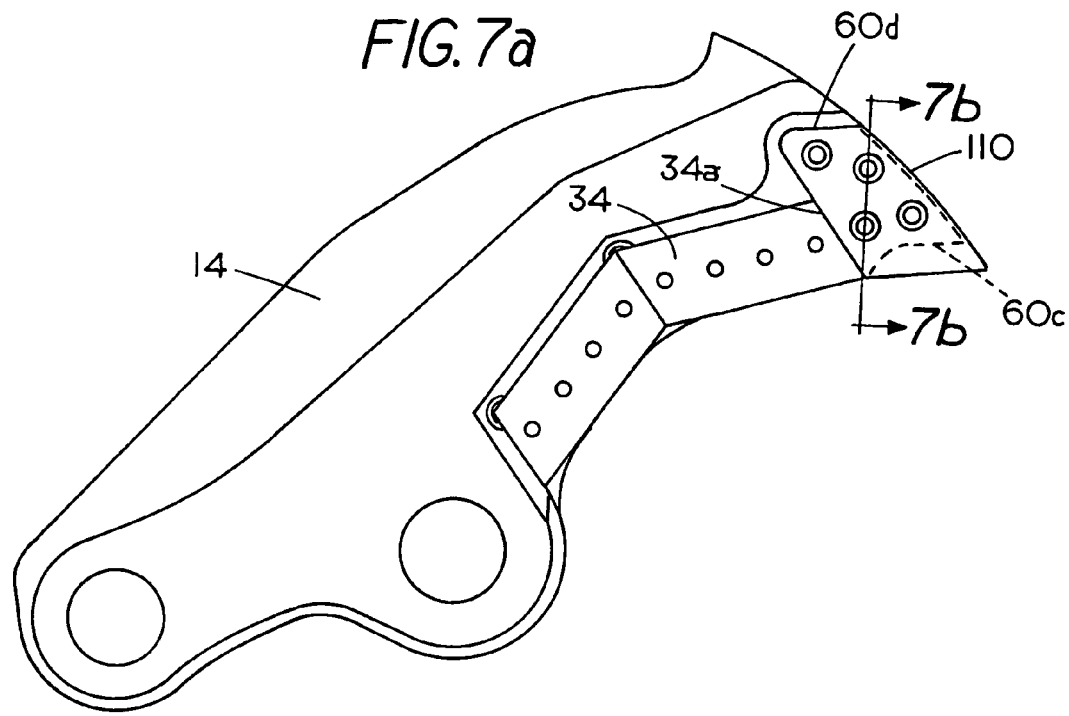
FIG. 7a is similar to FIG. 5, showing additional angles.
Figure 7B:
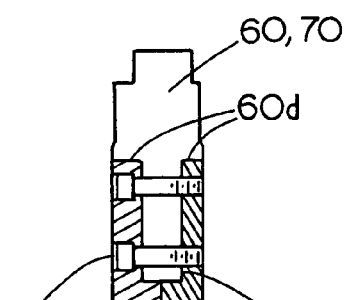

As a result of the above structure, as seen in FIGS. 7a and 7b, the replaceable shearing tip 110 will seat against the upper movable jaw 14 on at least three separate surfaces or seats: surfaces 60c, 60d, and 34a. This is in addition to the mounting surfaces 60a and 60b on the narrowed upper jaw tip portion 70. This feature greatly relieves stress on the tip 110 and serves to hold the tip 110 firmly in place on the upper jaw 14 as the tip 110 pierces and is later withdrawn from the workpiece.

In addition, the structure of the replaceable shearing tip 110 encapsulates the narrowed upper jaw tip portion 70 and protects it. The tip 110 is more durable than previous replaceable tips and the fastening systems used therewith. Because the tip 110 is constructed of paired halves 110a, 110b, in the event that one of the halves is damaged, it is only necessary to replace that half and not the whole tip.

The socket-headed or spline-headed cap-screws 120 allow the tip 110 to be attached to the upper jaw 14 without bolts, improving strength and allowing more material to be used in the upper jaw. Further, an Allen wrench can be used to drive the socket-headed cap-screws 120 into the bores 124, instead of using a box-end wrench of socket wrench on the outside of the screw heads 120a. This requires less material to be removed from the upper jaw 14.

Applicant has found that, for optimum performance and reliability of the replaceable shearing tip 110, a number of important angular relationships between the parts thereof and the upper jaw 14 are highly desirable.

Figure 10:
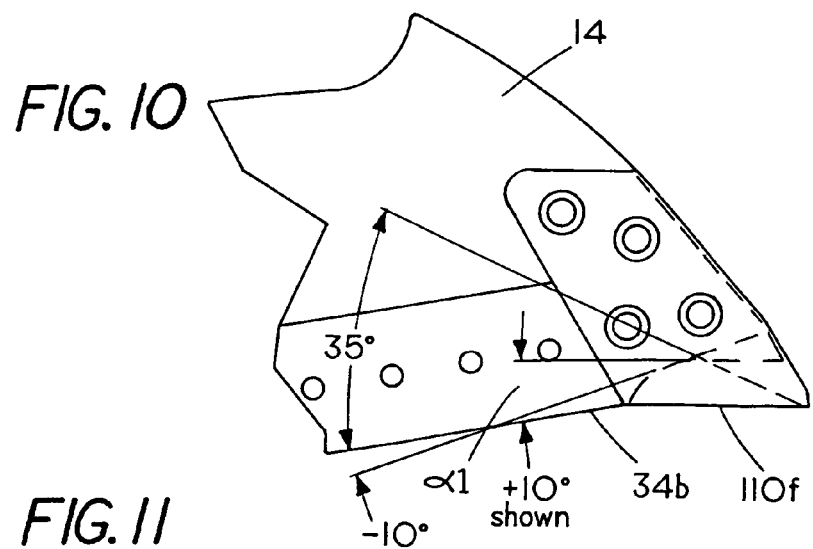
FIG. 10 is similar to FIG. 5, showing additional angles.

First, as best seen in FIGS. 5 and 10, an angle $\alpha 1$ between the bottom edge 110f of each of the first half 110a and second half 110b and the lower edge 34b of the secondary shear blade 34 should be in the range of $-10°$ to $+35$. FIG. 10 shows an angle $\alpha 1$ of $+10°$. This optimization tends to prevent the piercing tip 110 from moving outward from the secondary blade 34 as the piercing tip 110 contacts the workpiece.

Figure 9:
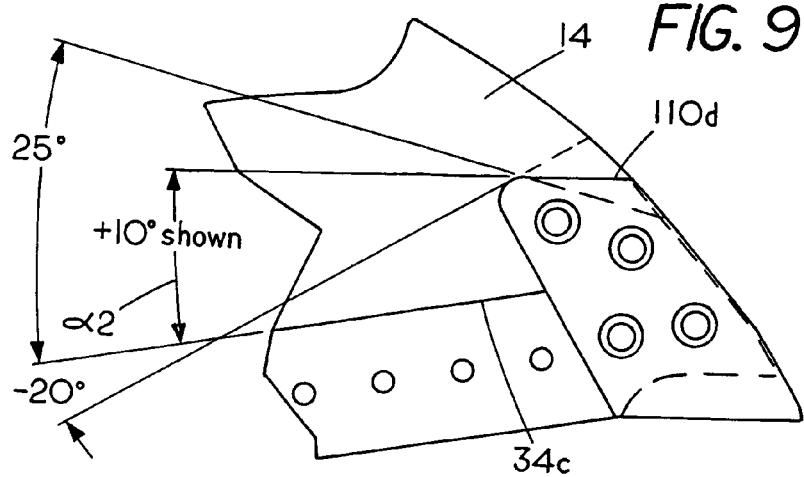
FIG. 9 is similar to FIG. 5, showing additional angles.

Second, as best seen in FIGS. 5 and 9, an angle $\alpha 2$ between the fourth mounting surface 110d and the top edge 34c of the secondary shear blade 34 should be in the range of $-20°$ to $+25°$. FIG. 9 shows an angle $\alpha 2$ of $+10°$. This optimization helps to hold the tip 110 in place on the upper jaw 14 from a force trying to push the tip 110 forward from the forward edge 34a of the secondary shear blade 34.

Figure 11:
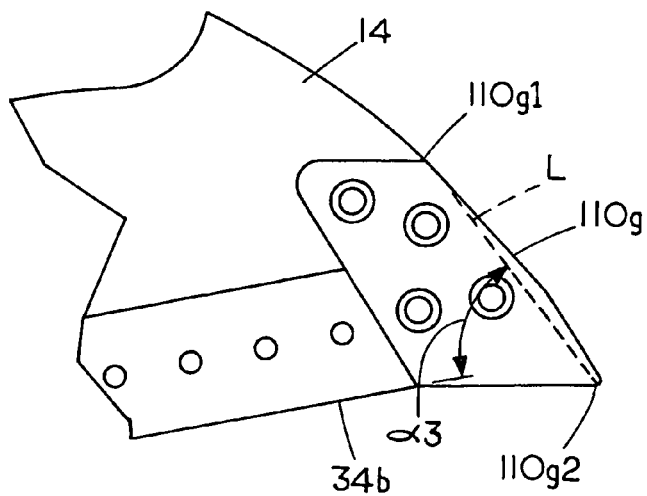
FIG. 11 is similar to FIG. 5, showing additional angles.

Third, as best seen in FIGS. 5 and 11, an angle $\alpha 3$ between the front surface 110g of either the first half 110a or the second half 110b, and the lower edge 34b of the secondary shear blade 34 should be in the range of 55° to 75°. In the embodiment shown in the phantom line L in FIG. 12, the angle $\alpha 3$ is measured between the lower edge 34b and a line L from the top corner 110g1 to the bottom corner 110g2 of the front surface 110g.

Figure 12:
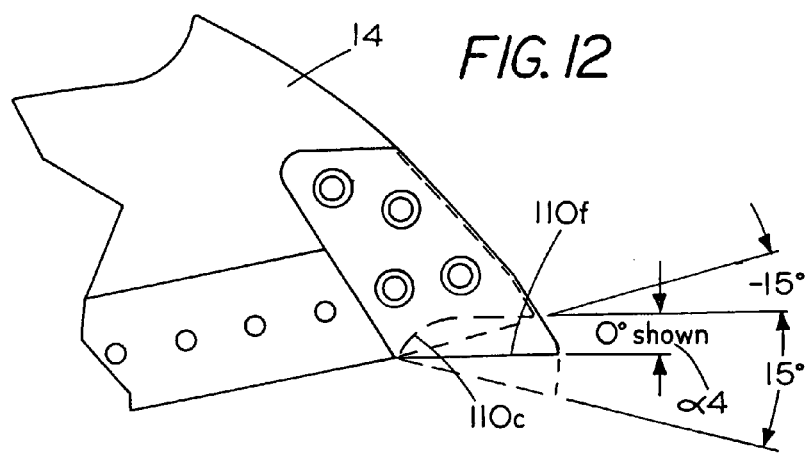
FIG. 12 is similar to FIG. 5, showing additional angles.
Figure 13:
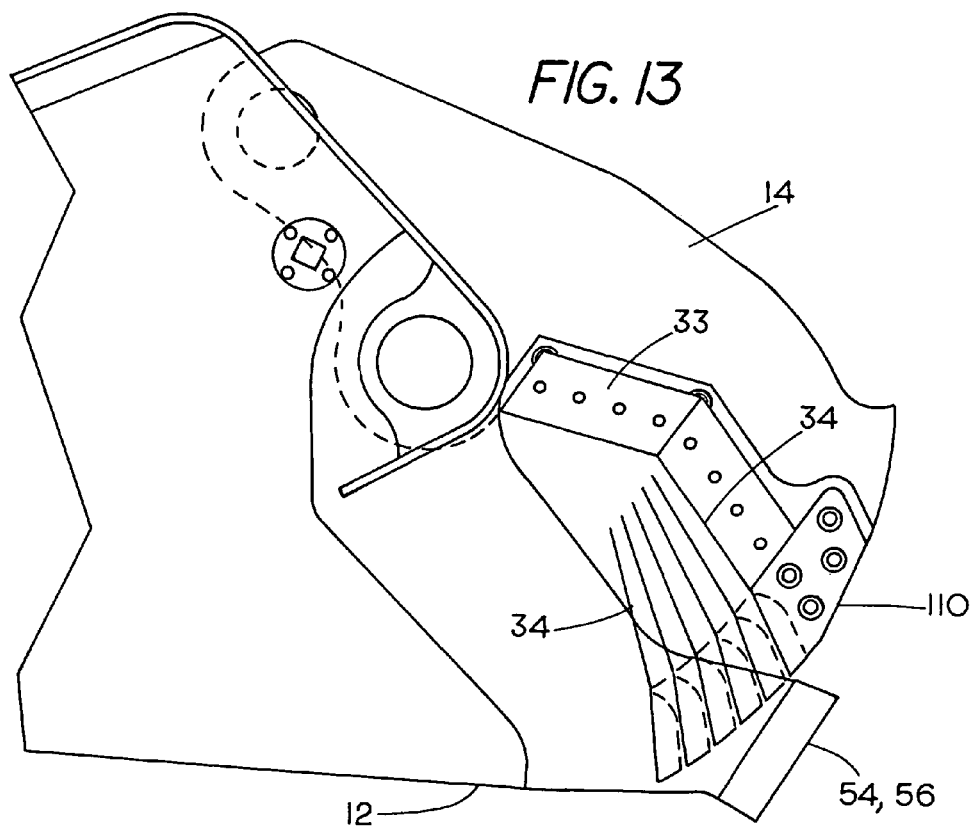
FIG. 13 is a right-side elevational view of the apparatus of the present invention.

Fourth, as best seen in FIG. 12, an angle $\alpha 4$ between the bottom edge 110f of the replaceable shearing tip 110 and the ledge or flange 110c should be in the range of $-15°$ to $+15°$.

FIG. 14 shows the sequence of positions that the tip 110 will take within the lower jaw 12 as the upper jaw 14 closes on the lower jaw 12. It will be seen that force directed against the tip 110 by the workpiece will result in force being applied to the secondary shearing blade 34 at a variety of angles as the tip successively encounters and the penetrates the workpiece (not shown). The structure of the tip 110 serves to keep the tip 110 firmly in contact with the secondary shear blade 34 with minimum stress.

The present invention may be embodied in other specific forms without departing from the spirit or essential attributes thereof, and it is therefore desired that the present embodiment be considered in all respects as illustrative and not restrictive reference being made to the appended claims rather than to the foregoing description to indicate the scope of the invention.

What is claimed:

1. A heavy-duty demolition shear with a replaceable shearing tip, the apparatus having a lower jaw and an upper jaw pivotally connected to the lower jaw, the upper jaw having a shearing blade, comprising:
    (a) a tip mounting portion on the upper jaw, the shearing blade having a cutting edge on a lower, planar shearing surface and a tip mounting surface, the tip mounting surface meeting the cutting edge an acute angle to the cutting edge;
    (b) a replaceable shearing tip mountable to the tip mounting portion, wherein the replaceable shearing tip further comprises two sections encompassing the tip mounting portion there-between, wherein the two sections are L-shaped and having a first arm and a second arm, the first arm and the second arm each comprising a continuous planar surface;
    (c) wherein the first arm of the L meets the cutting edge of the shearing blade at an oblique angle; wherein the upper jaw further comprises at least three seats for engaging the replaceable shearing tip, wherein one of the at least three seats is the tip mounting surface of the shear blade, and wherein the replaceable shearing tip abuts firmly against the tip mounting surface without a gap; and
    (d) wherein the continuous planar surface of the second arm of the L forms a dihedral angle with the plane of the shearing surface of the shearing blade.

2. A heavy-duty demolition shear with a replaceable shearing tip, the apparatus having a lower jaw and an upper jaw pivotally connected to the lower jaw by a pivot means, the upper jaw having a shearing blade, the shearing blade having a cutting edge and a shearing surface, comprising:
    (a) a replaceable shearing tip;
    (b) a replaceable shearing tip mounting portion on the upper jaw, wherein the replaceable shearing tip further comprises two sections encompassing the replaceable shearing tip mounting portion there-between, wherein the two sections are L-shaped;
    (c) the shearing blade having a replaceable shearing tip mounting surface, the replaceable shearing tip mounting surface meeting the cutting edge at an acute angle to the cutting edge;
    (d) wherein the replaceable shearing tip abuts firmly against the replaceable shearing tip mounting surface without a gap;
    (e) the replaceable shearing tip meets the cutting edge of the shearing blade at an oblique angle; and
    (f) wherein each of the L-shaped sections further comprises a first arm and a second arm, each of the first arm and the second arm comprising a continuous planar surface, the first arm abutting against the replaceable shearing tip mounting surface of the shearing blade without a gap, the shearing surface of the shearing blade forming a single continuous plane parallel to the axis of the pivot means, the single continuous planar surface of the second arm meeting the single continuous plane of the shearing surface of the shearing blade at a dihedral angle.

3. A heavy-duty demolition shear with a replaceable shearing tip, the apparatus having a lower jaw and an upper jaw pivotally connected to the lower jaw, the upper jaw having a shearing blade, the shearing blade having a first side, a second side, and a lower, planar shearing surface between the first side and the second side of the heavy duty demolition shear comprising:
    (a) a tip mounting portion on the upper jaw, the shearing blade having a cutting edge and a tip mounting surface, the tip mounting surface meeting the cutting edge at an acute angle to the cutting edge;
    (b) a replaceable shearing tip mountable to the tip mounting portion, wherein the replaceable shearing tip further comprises two sections encompassing the tip mounting portion there-between, wherein the two sections are L-shaped and having a first arm and a second arm;
    (c) wherein the first arm of the L-shape meets the cutting edge of the shearing blade at an oblique angle; wherein the upper jaw further comprises at least three seats for engaging the replaceable shearing tip, wherein one of the at least three seats is the tip mounting surface of the shear blade, and wherein the replaceable shearing tip abuts firmly against the tip mounting surface without a gap; and
    (d) wherein the second arm of the L forms a single continuous plane, said single continuous plane forming a dihedral angle with the lower, planar shearing surface.

4. The heavy-duty demolition shear of claim 3, wherein the acute angle and oblique angle are supplementary.

5. A heavy-duty demolition shear with a replaceable shearing tip, the apparatus having a lower jaw and an upper jaw pivotally connected to the lower jaw, the upper jaw having a shearing blade, the shearing blade having a cutting edge on a lower, planar shearing surface, comprising:
    (a) a replaceable shearing tip;
    (b) a replaceable shearing tip mounting portion on the upper jaw, wherein the replaceable shearing tip further comprises two sections encompassing the replaceable shearing tip mounting portion there-between, wherein the two sections are L-shaped;
    (c) the shearing blade having a replaceable shearing tip mounting surface, the replaceable shearing tip mounting surface meeting the cutting edge at an acute angle to the cutting edge;
    (d) wherein the replaceable shearing tip abuts firmly against the replaceable shearing tip mounting surface without a gap;
    (e) the replaceable shearing tip meets the cutting edge of the shearing blade at an oblique angle; and
    (f) wherein each of the L-shaped sections further comprises a first arm and a second arm, the first arm abutting against the replaceable shearing tip mounting surface of the shearing blade without a gap, the second arm of the L lying in a single continuous plane, the plane of the second arm meeting the plane of the shearing surface at a dihedral angle.

6. The heavy demolition shear of claim 5, wherein the acute angle and the oblique angle are supplementary.

* * * * *